United States Patent
Brill et al.

(10) Patent No.: US 6,542,621 B1
(45) Date of Patent: Apr. 1, 2003

(54) METHOD OF DEALING WITH OCCLUSION WHEN TRACKING MULTIPLE OBJECTS AND PEOPLE IN VIDEO SEQUENCES

(75) Inventors: Frank Z. Brill, Plano, TX (US); Thomas J. Olson, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/386,871

(22) Filed: Aug. 31, 1999

Related U.S. Application Data

(60) Provisional application No. 60/098,470, filed on Aug. 31, 1998.

(51) Int. Cl.[7] .................................................. G06K 9/00
(52) U.S. Cl. ........................................ 382/103; 382/291
(58) Field of Search ................................ 382/107, 209, 382/257, 103, 291; 73/488; 348/154, 155; 356/27

(56) References Cited

U.S. PATENT DOCUMENTS

| | | | |
|---|---|---|---|
| 5,625,715 A | * 4/1997 | Trew et al. ................. 348/169 |
| 5,734,737 A | * 3/1998 | Chang et al. ........... 375/240.15 |
| 5,845,009 A | * 12/1998 | Marks et al. ................. 348/169 |
| 5,856,844 A | * 1/1999 | Batterman et al. ........... 345/158 |
| 6,049,363 A | * 4/2000 | Courtney et al. ............ 348/700 |
| 6,233,008 B1 | * 5/2001 | Chun ........................... 348/170 |
| 6,240,197 B1 | * 5/2001 | Christian et al. ............ 348/169 |

* cited by examiner

Primary Examiner—Timothy M. Johnson
(74) Attorney, Agent, or Firm—Robert D. Marshall, Jr.; W. James Brady, III; Frederick J. Telecky, Jr.

(57) ABSTRACT

This invention employs probabilistic templates, or p-templates, which probabilistically encode the rough position and extent of the tracked object's image. The p-templates track objects in the scene, one p-template per object. They can be used to incorporate three-dimensional knowledge about the scene, and to reason about occlusion between the objects tracked by the p-templates. This invention requires video capture and digitization hardware, image processing hardware such as a digital signal processor, and a method for estimating the image size of a person standing at a given location in the image.

16 Claims, 9 Drawing Sheets

METHOD OF DEALING WITH OCCLUSION WHEN TRACKING MULTIPLE OBJECTS AND PEOPLE IN VIDEO SEQUENCES

This application claims priority under 35 USC §119(e)(1) of Provisional Application No. 60/098,470, filed Aug. 31, 1998.

TECHNICAL FIELD OF THE INVENTION

The technical field of this invention is automatic security systems particularly automatic security systems employing computer image processing for tracking objects in a video sequence.

BACKGROUND OF THE INVENTION

The goal is to track multiple people and objects (e.g., vehicles) in video sequences when the objects may be partially occluded by each other. Prior art is background differencing, which cannot handle multiple objects with merges or occlusions; template matching, which cannot handle strong object deformations; and histogram matching, which requires tracked objects to have color or grey-scale features which differentiate the people being tracked.

SUMMARY OF THE INVENTION

The new method employs the novel concept of a probabilistic templates, or p-templates, which probabilistically encode the rough position and extent of the tracked object's image. The p-templates track objects in the scene, one p-template per object. They can be used to incorporate three-dimensional knowledge about the scene, and to reason about occlusion between the objects tracked by the p-templates. P-template tracking is robust to deformations such as arm gestures, and to strong occlusions.

This invention enables digital video camera applications that require tracking with robustness to occlusion. Our method will help to create new markets for networked digital cameras that analyze the video stream. The method is suitable for implementation on digital signal processors. Applications are in physical security, home automation, and sporting event analysis.

This invention requires video capture and digitization hardware, image processing hardware such as a digital signal processor, and a method for estimating the image size of a person standing at a given location in the image. This estimate of image size could be as described in co-pending U.S. Patent Provisional Application No. 60/083,711 entitled "METHOD AND APPARATUS FOR MAPPING A LOCATION FROM A VIDEO IMAGE TO A MAP," now U.S. patent Ser. No. 09/292,499.

BRIEF DESCRIPTION OF THE DRAWINGS

These and other aspects of this invention are illustrated in the drawings, in which.

DETAILED DESCRIPTION OF PREFERRED EMBODIMENTS

In applications such as physical security, home automation, and sporting event analysis, it is often necessary to track the movements of one or more people and objects in a scene monitored by a video camera. In real scenes, the objects move in unpredictable ways, may move close to one another, and may occlude each other. When a person moves, the shape of his or her image changes. These factors make it difficult to track the locations of individual objects throughout a scene containing multiple objects. This application describes a new method for tracking objects in video sequences which can maintain the integrity of the tracks of object even when they partially occlude one another.

In order to discuss methodology, some common terms need to be defined for clarity:

An object is an abstract entity which represents a real-world object. An object has blobs associated with it which correspond to the real-world object.

An image is a picture consisting of an array of pixels.

A video image is one image out of an input image stream constituting an image sequence.

A reference image is an image of a scene corresponding to the background. Objects are generally detected from the difference between the current video image and the reference image.

A background image is an image of the scene with only background objects in it. It is usually used as the reference image.

A difference image is a binary image which is the result of thresholding the absolute difference of two video images. Thresholding the difference ensures that the difference image represents areas where the two video images differ significantly. It is typical to form such a difference between the current video image and the reference image.

Blobs are groups of connected pixels in a difference image which represent the change regions between the two video images. Blobs usually correspond to objects in the foreground of a scene.

A frame is an abstract entity which consists of a collection of objects and represents a video image.

Objects in consecutive frames which correspond to each other are linked together to form a motion graph.

Figure 1:
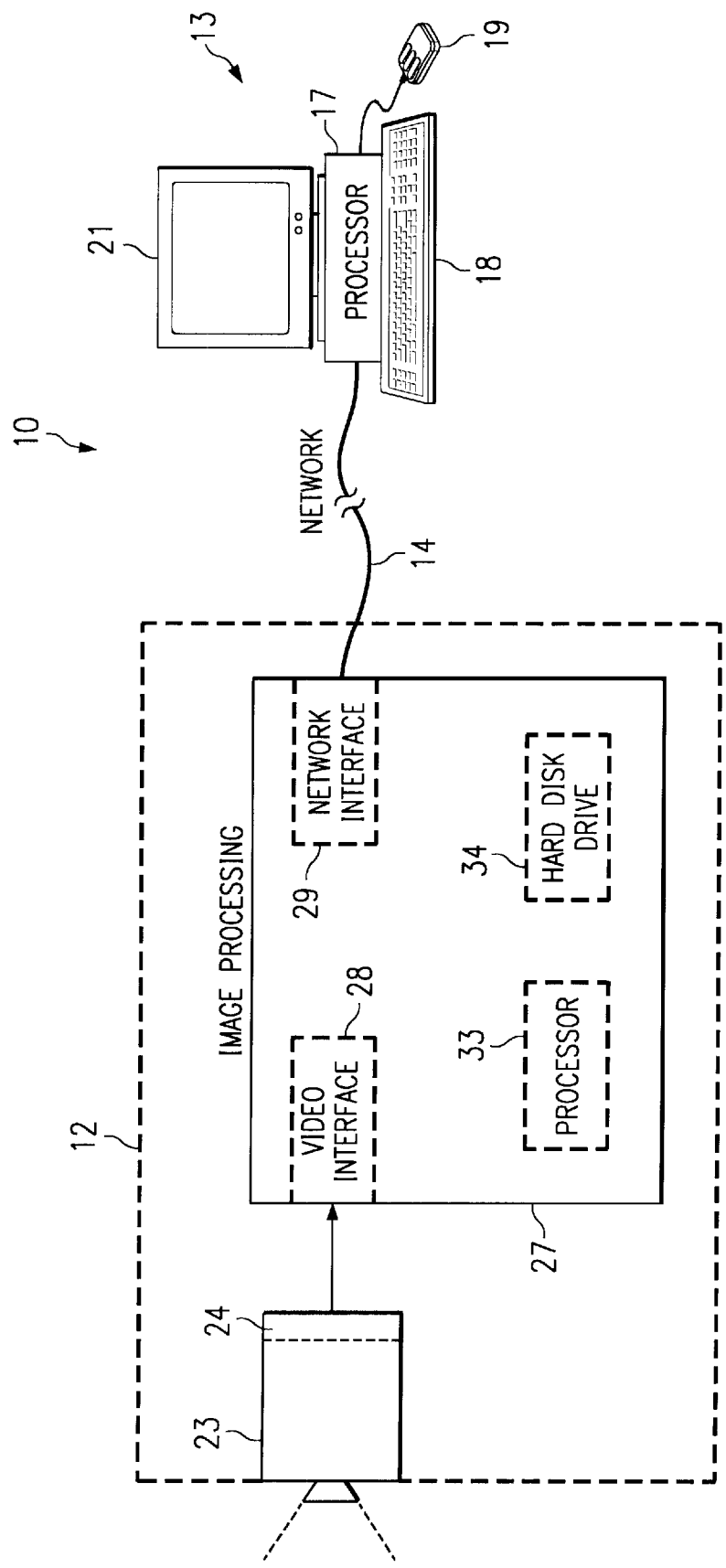
FIG. 1 is a diagrammatic view of a surveillance system 10 used monitor activity in a selected region or area.

FIG. 1 is a diagrammatic view of a surveillance or monitoring system 10 which embodies the present invention, and which is used monitor activity in a selected region or area. The monitoring system 10 also includes a camera unit 12, a computer workstation 13, which are operatively coupled by a network shown diagrammatically at 14. The network 14 may be a local area network, the Internet, some other type of network, a modem link or a combination of these technologies. The computer workstation 13 may be a personal computer including a processor 17, a keyboard 18, a mouse 19 and a display unit 21.

The camera unit 12 includes video camera 23. Video camera 23 in the disclosed embodiment is a known monochrome camera that outputs gray-scale images. However, the present invention may be utilized with a color video camera or some other type of two-dimensional image detector, such as an infrared detector. Video camera 23 includes detector 24. Detector 24 may be a charge coupled device (CCD) or a CMOS image detector as known in the art. Video camera 23 includes not-illustrated optics of a known type, which focuses an image on detector 24.

Camera unit 12 further includes an image processing section 27. The image processing section 27 includes a video interface circuit 28 to receive the output of image detector 24. A network interface 29 facilitates communication across network 14. Image processing section 27 could also include a modem in addition to or in place of network interface 29. This would enable communications via a telephone line. Image processing section 27 further includes a processor 33. Processor 33 preferably consists of a digital signal processor and its corresponding volatile memory. Image processing section 27 includes a non-volatile memory such as hard disk drive 34 illustrated in FIG. 1. Hard disk drive 34 could optionally be replaced or supplemented by another suitable type of non-volatile memory such as FLASH memory, EPROM memory or DRAM memory with battery backup.

In the preferred embodiment, image processing section 27 is co-located in the same physical housing as camera 23. Thus camera unit 12 is a stand alone device which may be directly coupled to network 14. However, it will be recognized by those skilled in the art that image processing section 27 could alternatively be implemented within computer workstation 13 and physically separate from camera 23. In this alternative, computer workstation 13 preferably includes a plug-in video capture card serving a video interface and a plug-in network interface card for communication via network 14. Though the embodiment disclosed includes a single camera 23, it is possible to provide plural cameras with a single image processing section.

The basic system performs three data processing steps for every image of a video sequence to recognize events. The three steps are detecting objects, tracking objects, and analyzing the motion graph.

The first step used in recognizing events is finding interesting objects in the scene. This task is accomplished using a two dimensional change detection technique that is commonly used in image analysis. Basically, a background image is taken of the scene to be monitored. This background image ideally contains only background objects. That is, which are stationary and deemed unimportant. This background image is used as the system's reference image. To detect objects in the scene for a give video image, the system first takes the absolute difference of the pixel values of the current video image and the reference image. This image is then thresholded to give a difference image of motion blobs. These motion blobs are regions where the current video image differs significantly from the background image. Then, heuristics are used to group these blobs into distinct objects. These objects are placed in a frame. The objects in their frame form an abstract representation of the video image. The goal of this step is to locate all the objects in a given video image.

Figure 2D:
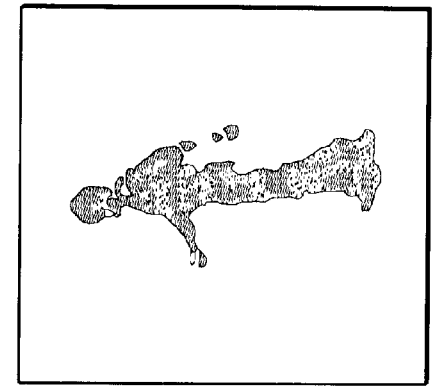
FIGS. 2A to 2H are views various stages of object recognition in a video image.
Figure 2C:
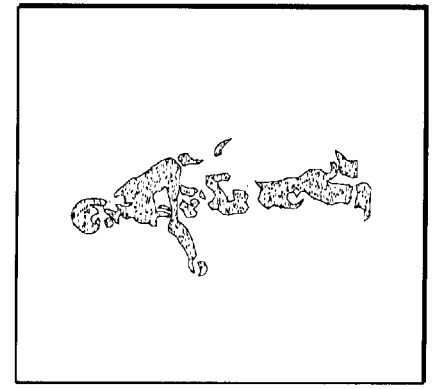
Figure 2B:
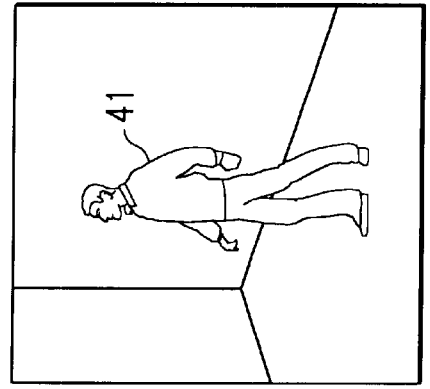
Figure 2A:
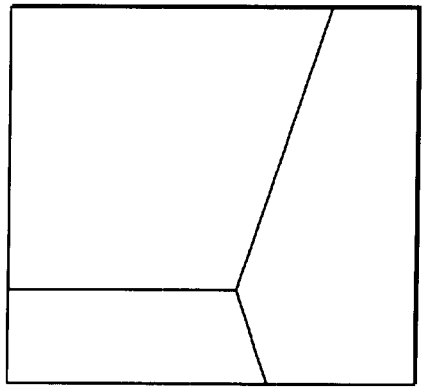
Figure 2H:
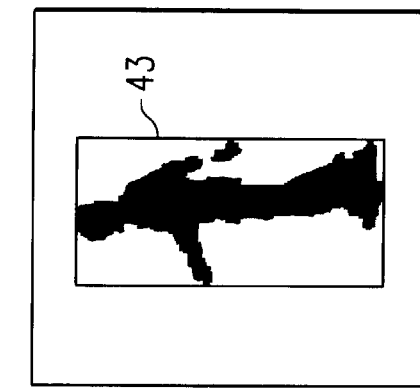

This initial processing of video images by the image processing section 27 will now be described with reference to FIGS. 2A to 2H. More specifically, FIG. 2A is a diagrammatic view of a video image produced by the video camera 12 when it is directed toward an area which, in this example, has arbitrarily been selected to be the corner of a room. The video image of FIG. 2A is saved as a reference image. FIG. 2B is a similar video image that was obtained from the camera 12 at a later point in time, after an object 41 has been introduced into the monitored area. In this case, the object 41 is a person, who has walked into the corner of the room and thus into the field of view of the video camera 12. The video camera 12 is stationary, and thus the single difference between the images of FIGS. 2A and 2B is the presence of the person 41 in FIG. 2B. The presence and movement of the person 41 is detected in the following manner.

First, the gray-scale image of FIG. 2B is subtracted from the gray-scale image of FIG. 2A, on a pixel-by-pixel basis. The absolute value of the difference for each pixel is then determined, and the result is the gray-scale difference image of FIG. 2C. Then, the difference image of FIG. 2C is sub-sampled in order to reduce the number of pixels, for example to a 128 by 128 or 256 by 256 pixel image. The resulting low-resolution image is shown in FIG. 2D. It will be recognized that it is alternatively possible to sub-sample each of the images of FIGS. 2A and 2B before determining the difference and absolute value for each pixel, which reduces the number of pixels that need to be processed, and therefore reduces the amount of time needed to obtain the image of FIG. 2D. Note that subsampling is not necessary if the system has sufficient computing capacity.

The low-resolution difference image of FIG. 2D is then thresholded. In other words, the gray-scale value for each pixel in the image of FIG. 2D is compared to a predetermined threshold, and the pixel is then set to be either on or off (black or white), depending on whether the value is above or below the threshold. The resulting threshold image is shown in FIG. 2E. Each pixel in the threshold image of FIG. 2E can be represented by a binary "1" or a binary "0", depending on whether the pixel is considered to be on or off.

Morphological processing is then carried out on each pixel of the threshold image of FIG. 2E, by first performing a dilate operation, and then performing an erode operation. More specifically, each pixel is processed by viewing it as the center pixel in a three-by-three matrix of pixels. During the dilate operation for each pixel in the threshold image of FIG. 2E, if any one of the eight neighboring pixels in that image is a logic "1", the pixel of interest is set to a logic "1". The resulting dilate image is shown in FIG. 2F. During the subsequent erode operation for each pixel in the dilate image of FIG. 2F, if any one of the eight neighboring pixels in that image is a logic "0", then the pixel of interest is set to a logic "0". The result is the erode image of FIG. 2G.

Figure 2G:
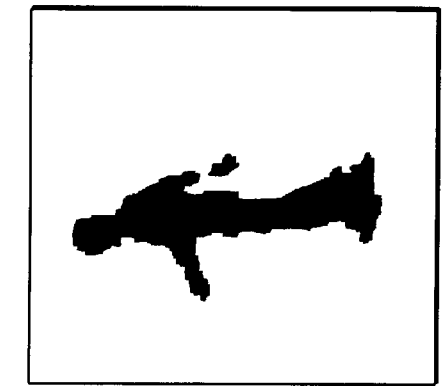
Figure 2F:
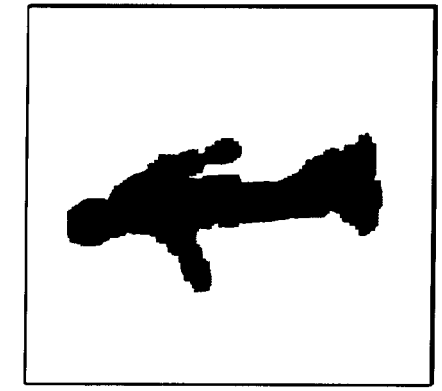
Figure 2E:
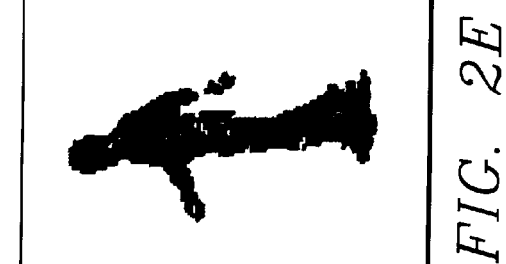

The erode image of FIG. 2G is then analyzed to identify each region of contiguous logic "1" pixels. Each such region of contiguous logic "1" pixels represents a change region, corresponding to an object which has been introduced into the image of FIG. 2B and which was not present in the image of FIG. 2A, such as the person 41. This analysis can be carried out using known techniques, such as connected-component analysis.

With respect to each detected change region, the image processing section 27 determines a bounding box for the change region. An example of a bounding box is shown at 43 in FIG. 2H. It will be noted that the bounding box 43 is a rectangular box, just large enough to contain the entire change region. That is, no pixel of the change region lies outside the box, but every side of the box touches at least one pixel of the change region.

The above-described image processing is carried out for each image in a succession of images provided by the video camera 12. That is, each of these successive images is processed with respect to the reference image of FIG. 2A, in the same manner that was described above for the image of FIG. 2B.

It is optionally possible to also carry out an identification analysis, in an attempt to identify a detected object. For example, with a small amount of knowledge about the topography of the monitored area, the image processing section 27 can use the position in the image of the midpoint of the lower side of the object's bounding box in order to identify how far the object is from the camera. Then, knowing how tall a person that far from the camera would appear in the image, the image processing section 27 can evaluate the vertical height of the bounding box in the image, in order to determine whether the object generating the change region is tall enough to be a person. If the object is sufficiently tall to be a person, it can be assumed that it is a person.

Alternatively, the computer could map the endpoints of the lower side of a bounding box from the video image to a map of the monitored area. Given the scale of the map, the image processing section 27 could determine the distance between these two points on the map, which corresponds to the distance between them in the video image, and would thus be the length of the lower side of the bounding box in the image. The computer could then determine the height of the bounding box in the video image, and evaluate whether the object in question is tall enough to be a person. If the object is sufficiently tall to be a person, the image processing section 27 assumes that it is a person.

If the object is not sufficiently tall to be a person, then the image processing section 27 can carry out an object analysis procedure, by analyzing the image of the object in an attempt to classify it as one of several common objects, such as a briefcase, a notebook, a box, or a computer monitor. If the object is not specifically identified through this approach, then it is ultimately identified as an unknown object.

Once objects are detected in a video image, the next step is to track each object through the video sequence. This task is done by linking objects in the previous frame to their corresponding objects in the current frame. Such tracking is the subject matter of this application.

Figure 3A:
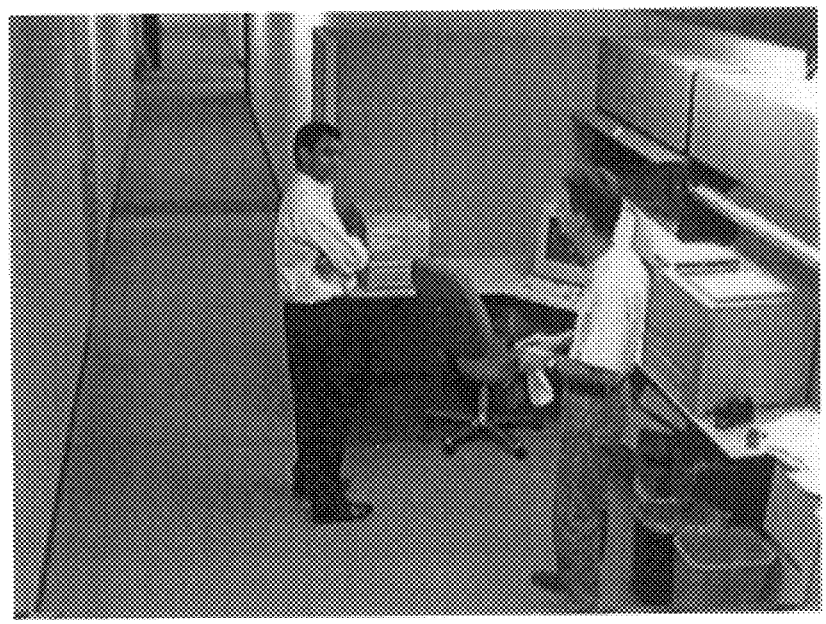
FIGS. 3A and 3B illustrate two views of an example scene containing two people.
Figure 3B:
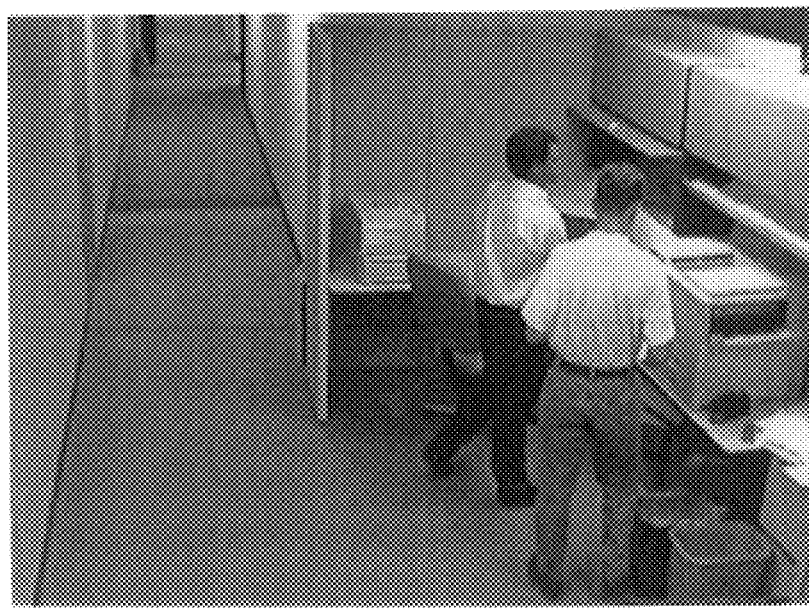
Figure 4A:
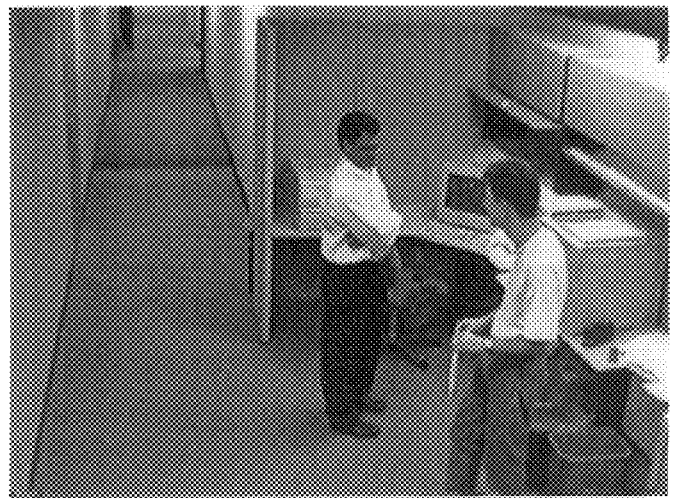
FIGS. 4A to 4J illustrate a sequence of video images in which it is particularly difficult to properly maintain the tracks of the two people in the scene.
Figure 4B:
Figure 4C:
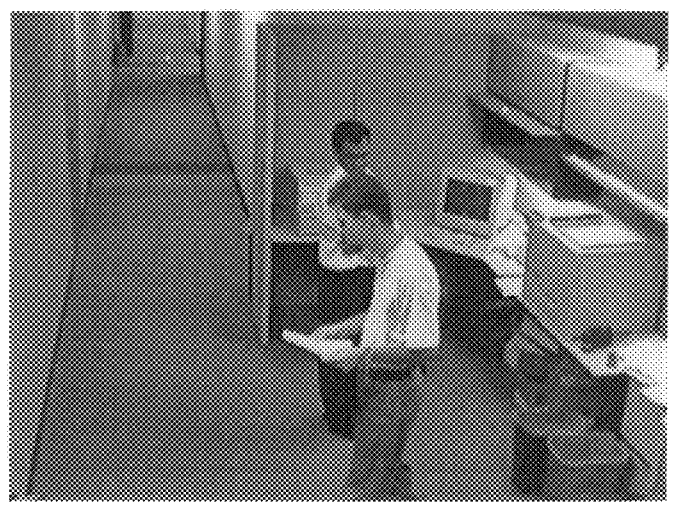
Figure 4D:
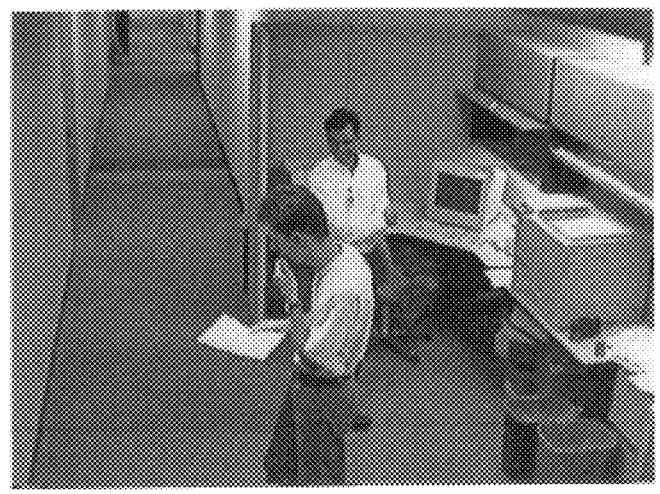
Figure 4E:
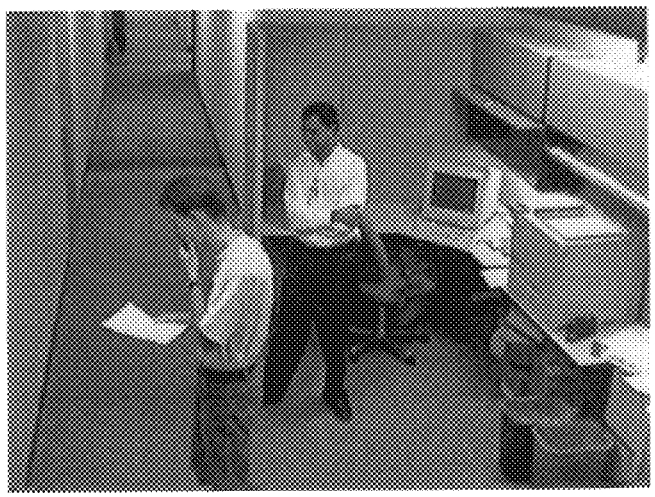
Figure 4F:
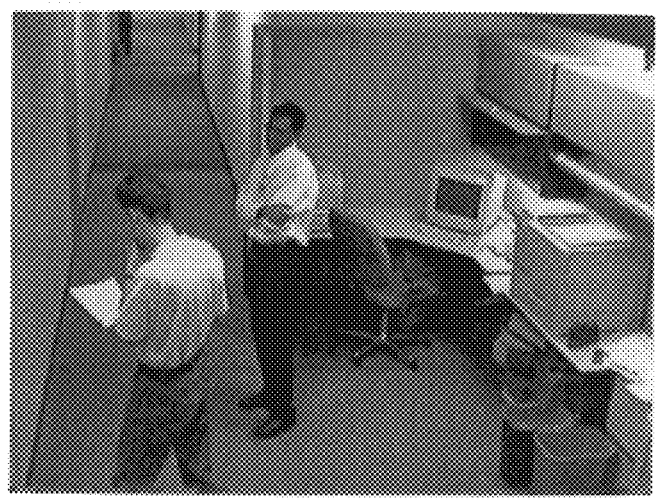
Figure 4G:
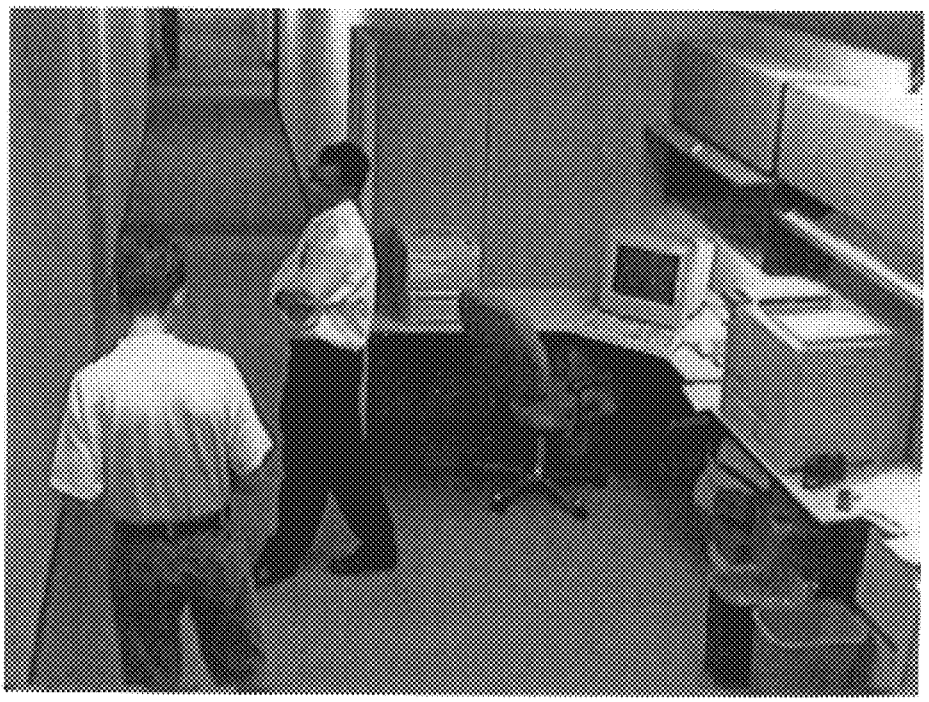
Figure 4H:
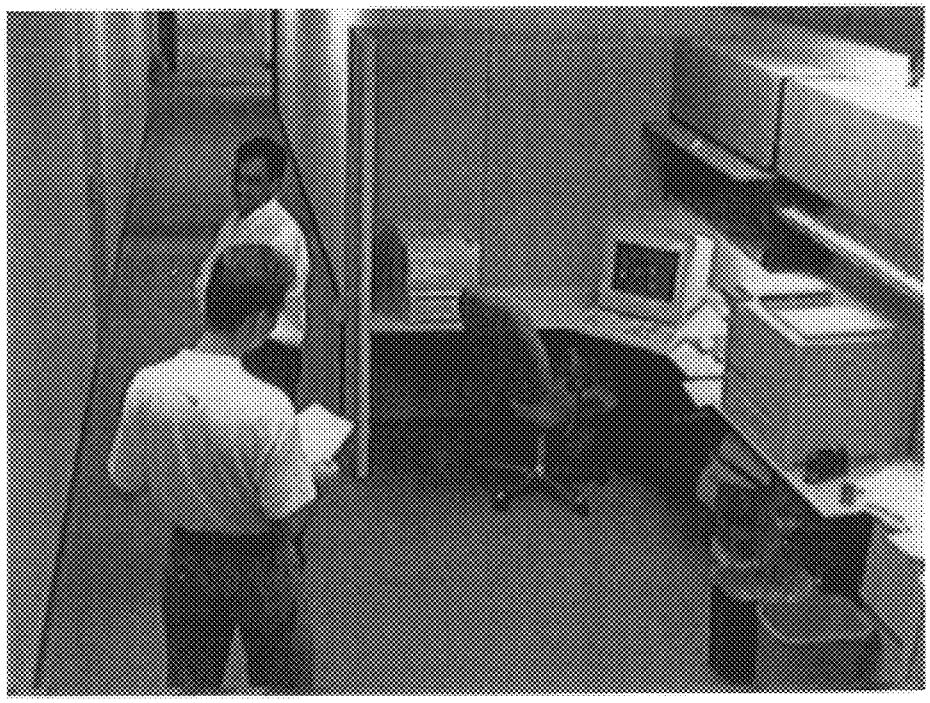
Figure 4I:
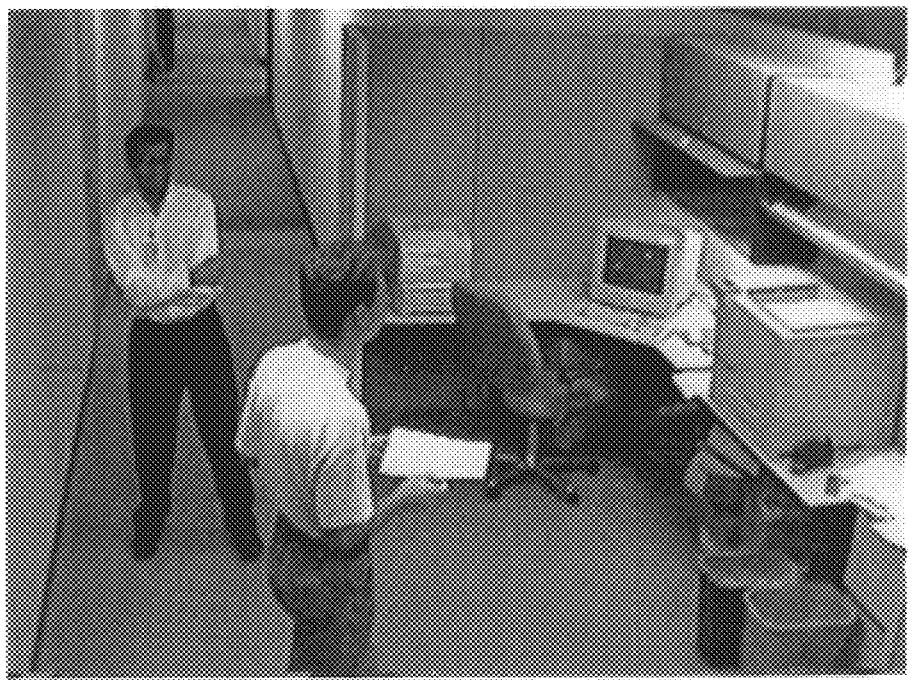
Figure 4J:
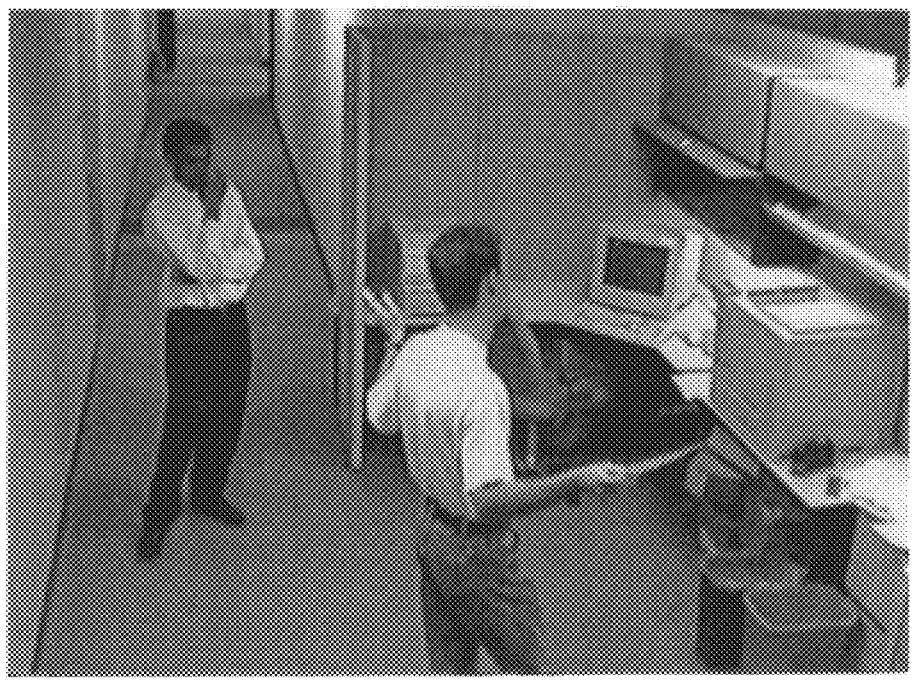

FIGS. 3A and 3B depict an example scene containing two people. In FIG. 3A, the two people are standing apart from each other, with Person-1 on the left, and Person-2 on the right. In FIG. 3B, Person-1 moves to the right so that he is partially occluded by Person-2. Using a conventional technique such a background subtraction, it is difficult to maintain the separate tracks of the two people in the scene, since the images of the two people merge into a single large region.

FIGS. 4A to 4J show a sequence of video images in which it is particularly difficult to properly maintain the tracks of the two people in the scene. In this sequence, Person-2 moves from right to left and back again, crossing in front of Person-1. There are significant occlusions particularly in FIGS. 4C and 4D. The orientations of both people with respect to the camera change significantly throughout the sequence. These factors make conventional template matching fail on this sequence.

Figure 5:
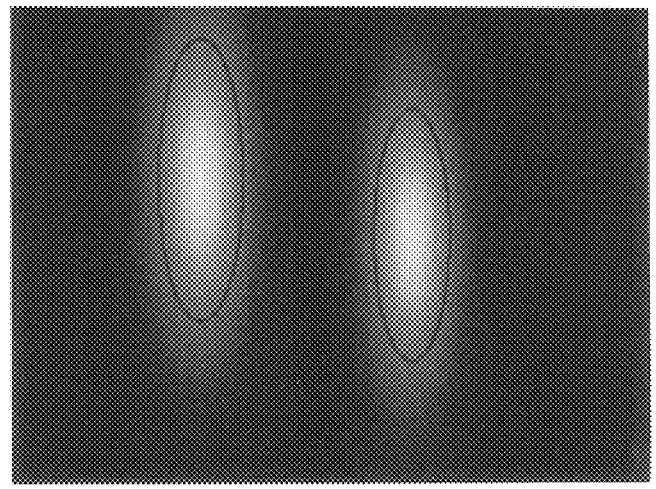
FIG. 5 illustrates predictive probabilistic templates for the scene illustrated in FIG. 3A.
Figure 6A:
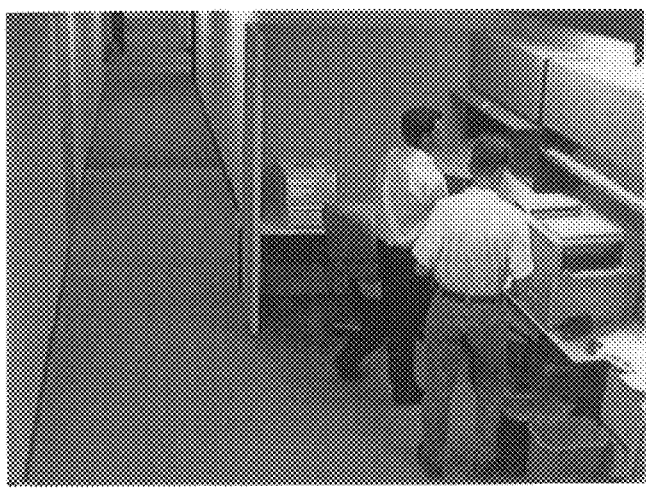
FIGS. 6A to 6D illustrate two examples of occlusion by the two people and the corresponding probablistic templates.
Figure 6B:
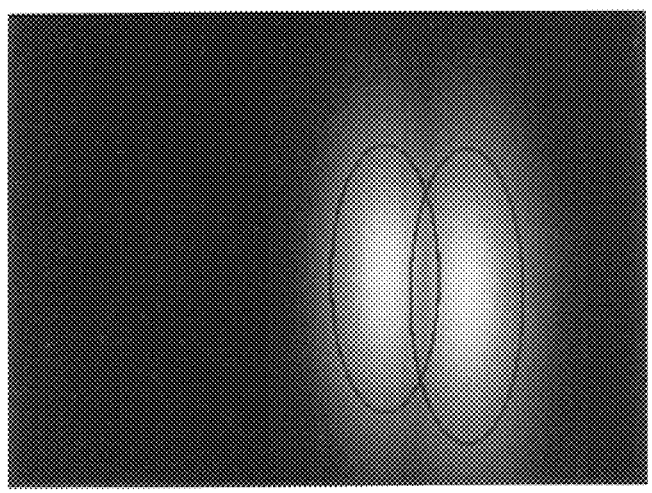
Figure 6C:
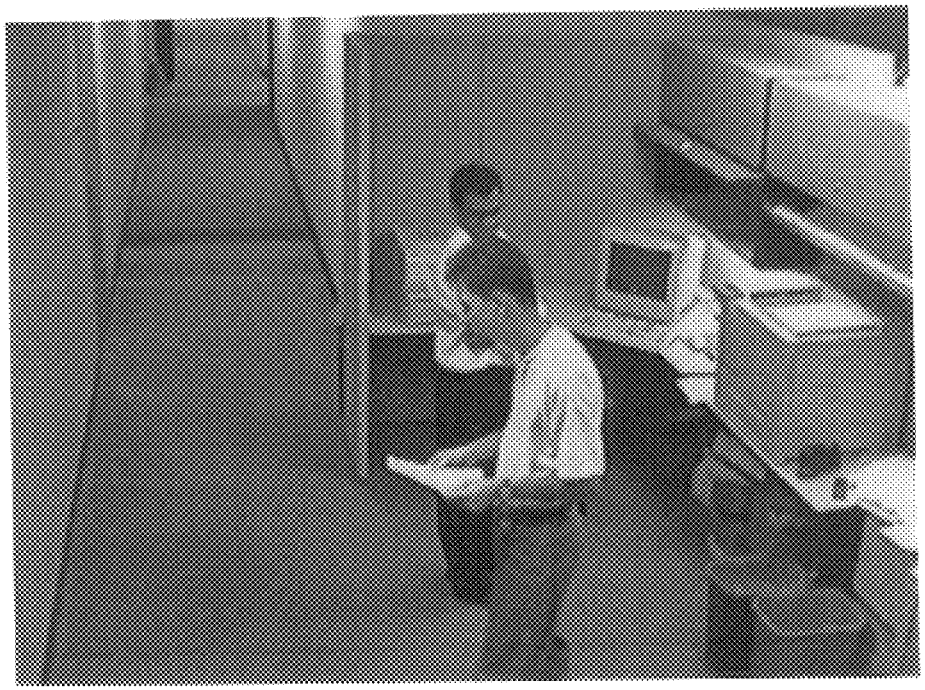
Figure 6D:
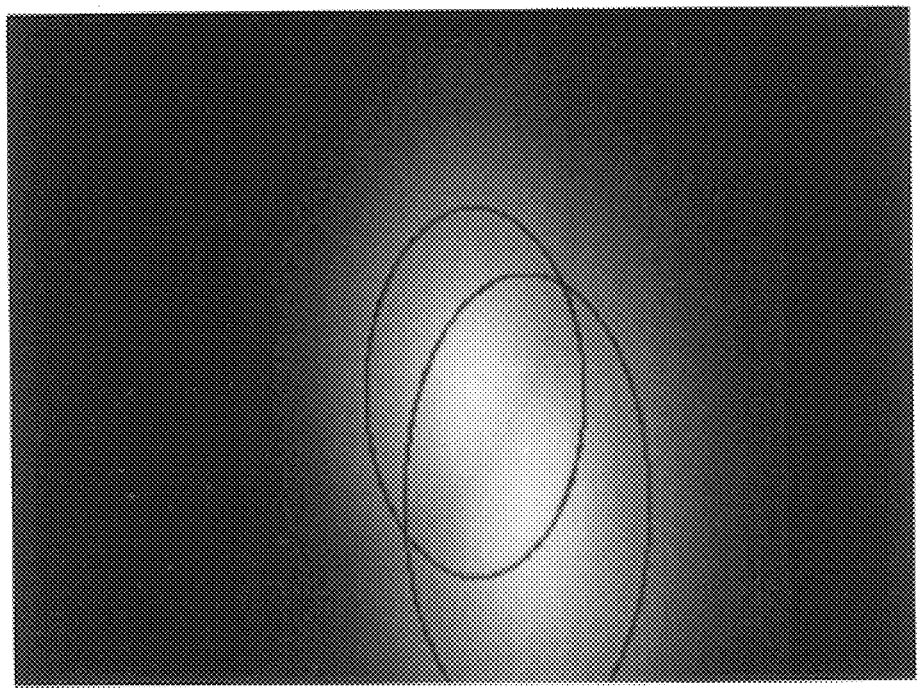

FIG. 5 illustrates a key feature of a new tracking method to maintain tracks in sequences such as those depicted in FIGS. 3A and 3B and FIGS. 4A to 4J. The method maintains an estimate of the size and location of the objects being tracked, and creates an image which represents the probability that the object intersects that pixel location. FIG. 5 illustrates the probability images for the two person scene of FIG. 4A. The first region 101 indicates the estimated location of Person-1, and the second region 111 indicates the estimated location of Person-2. The brightness of these regions indicates the probability that the person's image intersects the given pixel. This probability is highest in the middle of the region and decreases towards the edge. The size and shape of these regions are roughly the size and shape of a person standing at that location in the image. As will be detailed below, the preferred embodiment p-template model for a standing person is a Gaussian oval.

The person shaped probability regions are called probabilistic templates or simply p-templates. The path of the p-template through the scene represents the track of a given person which is maintained by the tracking system. P-templates can be used to reason about occlusion in a video sequence. The use of multiple p-templates to handle occlusion when tracking objects in video sequences is unique to the method of this invention. While this application will primarily address the issue of p-templates for tracking people walking upright, the concept is applicable to tracking any object, for example vehicles and crawling people. In these cases the shape of the p-template is be adapted to the type of object being tracked.

When the people in the scene overlap, the separate locations of the people can be maintained using the p-templates. Additionally, and the region of partial occlusion can be detected. FIGS. 6A to 6D show examples of such a situation. The first and second regions are maintained, even though the people are overlapping. The region of overlap between these two p-templates indicates that both people are at that location. The inventive method can track people through these occlusions by identifying and managing the occlusion regions separately from the unambiguous person regions. The tracks of the people can be maintained through occlusions by tracking primarily on the basis of the unambiguous area. This works well for the slight occlusion in shown FIGS. 6A and 6B. It also often works even for the very strong occlusions shown in FIGS. 6C and 6D. During the occlusions shown in FIGS. 6C and 6D, the head of Person-1 is tracked and the lower-body of Person-2 is tracked. The p-template regions illustrated in FIG. 6D clearly show that highest expected probability that a pixel of the video image is part of Person-1 is in the head region. Likewise, p-template regions illustrated in FIG. 6D clearly show that highest expected probability that a pixel of the video image is part of Person-1 is in the lower body region. Note that during an occlusion, the p-template for each person is widened slightly to account for the increased uncertainty of our estimate of the person's location.

The inventive method requires a means of instantiating a new p-template when a person enters the scene and updating the location of the region as the person moves through the scene. This application will first describe the update mechanism, assuming that the p-templates have already been instantiated. The instantiation mechanism is described later.

The p-templates described above and depicted in FIGS. 5, 6B and 6D represent the prior probabilities of the person locations based on the previous video image. This is a predictive probability employing only information from the prior video image. As previously described, the p-template is based upon a model of the object tracked. In the preferred embodiment, standing people are modeled as vertical ovals about two feet wide and about six feet tall. The actual model employed for a particular tracked object must be adapted to the object type tracked. These prior estimates of the probabilities are then used to compute an estimate of the posterior probabilities of the person locations by looking at the new or current video image. The computation of the posterior probabilities takes into account both the prior probabilities and the information in the new video image. The posterior probabilities are used to update the locations of the people, and the new locations of the people are then used to compute the priors for the next video image. Pseudo-code for the main tracking loop is given below.

```
while (tracking) {
    grab(new_image);
    posteriors = compute_posteriors(p_templates,new_image) ;
    locations = compute_locations (posteriors) ;
    p_templates = compute_p_templates(locations) ;
}
```

The first instruction grab (new_image) of this pseudo-code sequence obtains the pixel values of the new image and load these into an array.

The second instruction compute_posteriors of this pseudo-code sequence computes the posterior probabilities of the identity of the pixel. The preferred embodiment computes the posteriors using a form of background differencing. This is similar to the prior art object detection technique described above. The following description of the posterior computation given here will be a slight simplification for ease of explanation. A more complete description will be made below in the description of p-template instantiation.

Initially raw probability values for each pixel are computed. The raw probability values are the probability that a projected light ray corresponding to the current pixel intercepts the background or a particular object regardless of the location of other objects. Note that this raw probability value for the background is 1 for every pixel. This is because a projected light ray for any pixel will inevitably reach a point on the background. The raw probability for tracked objects is the value of the corresponding p-template for the current pixel. Depending on the location of the model for that object, this raw probability value could be any value between 0.0 and 1.0. Pixels located near the center of the model would have higher raw probability values than pixels located farther away.

For every pixel these raw probabilities are normalized to one. That is, the raw probability values are adjusted so that the sum of all the raw probability values for any pixel is. 1.0. The raw probabilities for the background and for each object are divided by the sum of these raw probabilities at that pixel. For the background the normalized probability $N_B$ is thus:

$$N_B = \frac{R_B}{R_B + \sum_{\text{all } j} R_{oj}}$$

where: $R_B$ is the raw probability of the background; $R_{oj}$ is the raw probability of the j-th tracked object O; and the summation is over all tracked objects $O_j$. Recall that $R_B$ is 1 for every pixel. Thus:

$$N_B = \frac{1}{1 + \sum_{\text{all } j} R_{oj}}$$

This formula yields a normalized probability value $N_B$ near 1 for pixels where the raw probability values $R_{oj}$ are all near 0. This matches the intuitive notion that the probability that a pixel comes from the background is nearly 1 far from any tracked object. Similarly, the normalized probability $N_{oj}$ for the j-th tracked object is:

$$N_{oj} = \frac{R_{oj}}{1 + \sum_{\text{all } j} R_{oj}}$$

This computation of the posteriors then takes into account the pixel value at that pixel. By viewing the background images from the camera during times there are no objects for some amount of time, the system can develop a model of the background. The preferred embodiment computes the mean gray scale or color values and their variance over time at each pixel of the background. Using these statistics and assuming a normal distribution of the pixel values, we can compute the probability that the pixel is from the background given its pixel value. This probability is highest when the current pixel value equals the mean pixel value and decreases to near zero when the current pixel value is far from this mean pixel value. This knowledge of the color permits computation of a raw color corrected probability. The raw color corrected probability $K_B$ that a pixel having a given color C is from the background is:

$$K_B = N_B * p(B|C)$$

where p(B|C) is the computed probability that the pixel is from the background given its pixel value of C. As previously described p(B|C) is a Gaussian distribution around the mean pixel value having the observed variance.

A similar computation is made for each tracked object. It is possible to track the pixel values for each object, either for the object as a whole or by portions of the object. This would involve a color model of the object with mean pixel value and distribution computed for each pixel in the object model. However, in the preferred embodiment such detailed color modeling is not needed. Assuming that any possible pixel value is equally likely for any pixel of a tracked object $O_j$, then the probability that the pixel is from the object $O_j$ given its pixel value of C $p(O_j|C)$ is 1/M, where M is the number of possible pixel values. The raw color corrected probability $K_{oj}$ that a pixel having a given color C is from the background is:

$$K_{oj} = N_{Oj} * p(O_j | C) = N_{Oj} * \frac{1}{M}$$

where $p(O_j|C)$ is the computed probability that the pixel is from the j-th tracked object given its pixel value of C, here taken to equal 1/M.

These raw color corrected probabilities are then normalized to 1 for all pixels. This process is similar to that noted above. The normalized, color corrected probability $P_B$ that the pixel is background is:

$$P_B = \frac{N_B * p(B | C)}{N_B * p(B | C) + \sum_{\text{all } j} N_{oj} * 1/M}$$

remembering that the computed probability that the pixel is from the j-th tracked object given its pixel value of C is approximated by 1/M. Similarly, the normalized, color corrected probability $P_{oj}$ that the pixel if object $O_j$ is:

$$P_{oj} = \frac{N_{oj} * 1/M}{N_B * p(B|C) + \sum_{\text{all } j} N_{oj} * 1/M}$$

The computation takes into account the previously predicted probabilities of the p-templates, the current pixel value and location. Pixels where PB is above 0.50, typically where the pixel value is near the mean pixel value of the corresponding background image pixel and where the p-template values are low, are generally from the background. Pixels where $P_{oj}$ is above 0.50 generally belong to the object $O_j$. Also note that pixels where the $P_{oj}$ for two objects are comparable generally belong to areas of occlusion. The function compute_posteriors in the pseudo-code above takes as input p-templates such as those in shown in FIGS. 6B and 6D and the current images (new_image) such as those shown in respective FIGS. 6A and 6C. The function compute_posteriors produces posterior images.

Note that the preferred embodiment does not make any use of assumptions about the pixel values of the foreground objects. The foreground objects are simply taken to be different from background and in the right place, where 'right place' is determined by the location of the p-template. Note also that any other factor that might be predictive of the probability that the object is this pixel may be used here. Use of the pixel values of the foreground objects, for example, is possible but not necessary. Using such pixel values may enhance the tracking performance of the system.

Once the foot location and height of the person is computed, it is straightforward to compute the new location of the p-template. In the preferred embodiment the p-template of a standing person is simply a Gaussian oval whose location and dimensions are determined by the foot location and image height computed above. The vertical standard deviation of this Gaussian oval corresponds to the estimated three-dimensional height of about six feet. The horizontal standard deviation of this Gaussian oval corresponds to the estimated three-dimensional width of about two feet. Other, more complex p-template models are feasible, but this Gaussian oval provides acceptable performance. Other models with other dimensions are required to track non-person objects and persons who are not standing. The new p-template is then used to find the location of the person in the next video image, and the process repeats for as long as the person remains in the scene.

The above description omitted how the p-templates are instantiated and deleted. A new p-template must be instantiated whenever a new person enters the scene, and it must be deleted when that person leaves. Deletion is straight forward. When the posterior image no longer contains enough evidence for the object, the template is deleted. This means that the template for a tracked person is deleted if the there is not enough unoccluded or occluded pixels in the posterior image.

Instantiation is best described in a Bayesian probabilistic framework. The p-templates constitute models of the objects in the environment. All of the pixels in the image are the result of a projection of some object in the environment either from the background, one of the tracked people in the scene or something else. The sum of the probabilities that the pixel is either from the background, from a tracked person or from something else must be one. The system maintains an unknown model to account for the probability that pixels may arise as a result of something else. This unknown model assigns a small constant raw probability $R_U$ that any pixel is from an unknown object. This additional probability term is included in the normalized probabilities $N_B$ and $N_{oj}$. A similar normalized probability $N_U$ is also computed. Likewise a color corrected probability $K_U$ is computer. As in the preferred embodiment for calculating color corrected probabilities for tracked objects, the unknown object is assumed to have an equal probability of having any color value. Thus this color correction involves multiplication by 1/M. The color corrected probability $K_U$ is used in computing the normalized color corrected probabilities $P_B$ and $P_{oj}$ and a similar normalized color corrected probability for the unknown object $P_U$ is computed.

When these computation are performed, for some of the pixels, the probability that the pixel came from the unknown model is the highest of all of the model probabilities. In many cases this probability $P_U$ will be above 0.50. This level of probability will typically be reached if there is a new, untracked object in the scene that is far from other tracked objects and has a pixel value very different from the mean background pixel value. Under these conditions the raw probabilities for all tracked objects is low because the pixel under consideration is far from the objects, thus the p-templates yield low values. Additionally, with the pixel value different from the corresponding mean background pixel value, p(B|C) also will be near zero. Thus the small constant raw probability of an unknown object will predominate in the normalized color corrected probabilities. The pixels where this is true are examined to see if adding a new person model would account for these unknown pixels. Generally, this decision is based upon whether the unknown pixels form a person shaped blob. If so, a new person p-template is instantiated at the appropriate location, and the posteriors are recomputed. Note that another object type may be instantiated if the unknown pixels forms a good shape fit for the model for the other object type.

The addition of instantiation/deletion to the system results in the following pseudo-code:

```
while (tracking) {
    grab(new_image) ;
    posteriors = compute_posteriors(p_templates,new_image) ;
    if (instantiate_new_p_templates(unknown_model))
        posteriors = compute_posteriors(p_templates,
            new_image) ;
    locations = compute_locations (posteriors) ;
    p_templates = compute_p_templates(locations) ;
    delete_unsubstantiated(p_templates) ;
}
```

The new third instruction in this pseudo-code sequence recomputes the posteriors with a newly instantiated person model if the function instantiate_new_p_templates() yields a true result. The pseudo-code sequence includes a new final instruction for deleting a tracked object if the particular p-template predicts too few pixels within the next video image.

Use of the procedure described above to track people can maintain tracks through occlusions where previous techniques could not. The robustness to occlusion of the new method enables video monitoring applications to vastly improve their tracking reliability in natural environments. Moreover, the procedure is suitable for implementation on low-cost digital signal processors.

What is claimed is:

1. A computer implemented method of tracking moving objects in series of video images comprising the steps of:
    forming a probablistic model of tracked objects;
    determining a probability that said pixel corresponds to a background or to each tracked object for each pixel of a current video image dependent upon a pixel value of a current video image and a probablistic model of each tracked object from an immediately prior video image;

selecting a source for each pixel of said current video image from among said background and said tracked objects dependent upon said determined probabilities;

determining a location for each tracked object dependent upon said selected pixel sources; and projecting a probablistic model of each tracked object into a next video image based upon said determined location for each corresponding tracked object.

2. The computer implemented method of claim 1, wherein:

said step of determining a location for each tracked object includes tracking said probablistic model corresponding to each tracked object where said probablistic model produces a higher probability than said probablistic model of any other tracked object.

3. The computer implemented method of claim 1, wherein:

said step of projecting a probablistic model of each tracked object includes tracking three dimensional location of each tracked object and projecting an actual size of said probablistic model actual size into apparent size within said video image.

4. The computer implemented method of claim 3, wherein:

said step of forming a probablistic model of a tracked object includes forming a probabilistic model of a standing person as a Gaussian oval with vertical dimension corresponding to an actual height of about six feet and a horizontal dimension corresponding to an actual width of about two feet.

5. The computer implemented method of claim 1, wherein:

said step of determining a probability that said pixel corresponds to a background or to each tracked object includes computing a pixel value mean and pixel value variance for each pixel of background over a plurality of video images, and computing a raw probability that said pixel corresponds to background based upon a current pixel value relative to a Gaussian distribution of pixel values having said computed pixel value- mean- and pixel value variance of said pixel.

6. The computer implemented method of claim 5, wherein:

said step of determining a probability that said pixel corresponds to a background or to each tracked object includes computing a raw probability that said pixel corresponds to each tracked object based upon said probabilistic model of said object at said pixel and assuming all pixel values are equally likely for each tracked object.

7. The computer implemented method of claim 6, wherein:

said step of determining a probability that said pixel corresponds to a background or to each tracked object further includes computing an normalized probability for background and each tracked object.

8. The computer implemented method of claim 5, wherein:

said step of determining a probability that said pixel corresponds to a background or to each tracked object further includes setting a raw probability that said pixel corresponds to an unknown object as a small constant probability at every pixel, computing an normalized probability for background, each tracked object and said unknown object;

said step of selecting a source for each pixel of said current video image further includes selecting said unknown object as said source if said unknown object has a highest probability; and instantiating a new tracked object when pixels selected as from said unknown object are sufficient in number and distribution to match a probabilistic model of an object.

9. A apparatus for tracking moving objects in a defined space comprising:

a video imaging device forming a series of two dimensional video images of said defined space; and a data processing apparatus receiving said series of video images from said video imaging device, said data processing apparatus programmed to form a probablistic model of tracked objects;

determine a probability that said pixel corresponds to a background or to each tracked object for each pixel of a current video image dependent upon a pixel value of a current video image and a probablistic model of each tracked object from an immediately prior video image;

select a source for each pixel of said current video image from among said background and said tracked objects dependent upon said determined probabilities;

determine a location for each tracked object dependent upon said selected pixel sources; and project a probablistic model of each tracked object into a next video image based upon said determined location for each corresponding tracked object.

10. The apparatus for tracking moving objects of claim 9, wherein:

said data processing apparatus is further programmed to determine a location of for each tracked object by tracking said probablistic model corresponding to each tracked object where said probablistic model produces a higher probability than said probablistic model of any other tracked object.

11. The apparatus for tracking moving objects of claim 9, wherein:

said data processing apparatus is further programmed to project a probablistic model of each tracked object by tracking three dimensional location of each tracked object and projecting an actual size of said probablistic model actual size into apparent size within said video image.

12. The apparatus for tracking moving objects of claim 11, wherein:

said data processing apparatus is further programmed to form a probablistic model of a tracked object by forming a probabilistic model of a standing person as a Gaussian oval with vertical dimension corresponding to an actual height of about six feet and a horizontal dimension corresponding to an actual width of about two feet.

13. The apparatus for tracking moving objects of claim 9, wherein:

said data processing apparatus is further programmed to determine the probability that said pixel corresponds to a background or to each tracked object by computing a pixel value mean and pixel value variance for each pixel of background over a plurality of video images, and computing a raw probability that said pixel corresponds to background based upon a current pixel value relative to a Gaussian distribution of pixel values having said computed pixel value mean and pixel value variance of said pixel.

14. The apparatus for tracking moving objects of claim 13, wherein:

said data processing apparatus is further programmed to determine the probability that said pixel corresponds to a background or to each tracked object by computing a raw probability that said pixel corresponds to each tracked object based upon said probabilistic model of said object at said pixel and assuming all pixel values are equally likely for each tracked object.

15. The apparatus for tracking moving objects of claim 14, wherein:

said data processing apparatus is further programmed to determine the probability that said pixel corresponds to a background or to each tracked object by computing an normalized probability for background and each tracked object.

16. The apparatus for tracking moving objects of claim 13, wherein:

said data processing apparatus is further programmed to determine the probability that said pixel corresponds to a background or to each tracked object by setting a raw probability that said pixel corresponds to an unknown object as a small constant probability at every pixel, computing an normalized probability for background, each tracked object and said unknown object;

said data processing apparatus is further programmed to select the source for each pixel of said current video image by selecting said unknown object as said source if said unknown object has a highest probability; and said data processing apparatus is further programmed to instantiate a new tracked object when pixels selected as from said unknown object are sufficient in number and distribution to match a probabilistic model of an object.

\* \* \* \* \*